United States Patent
Gruber

(10) Patent No.: US 7,552,059 B2
(45) Date of Patent: Jun. 23, 2009

(54) MATERIAL ORDERING AND REPORTING EXPEDITER (MORE)

(75) Inventor: Robert Michael Gruber, Camarillo, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 642 days.

(21) Appl. No.: 11/086,733

(22) Filed: Mar. 17, 2005

(65) Prior Publication Data

US 2005/0165659 A1 Jul. 28, 2005

Related U.S. Application Data

(63) Continuation-in-part of application No. 09/760,341, filed on Jan. 10, 2001, now abandoned.

(51) Int. Cl.
*G06Q 99/00* (2006.01)
(52) U.S. Cl. .................... 705/1; 705/26; 705/37; 705/39; 705/40; 715/210
(58) Field of Classification Search ............... 705/1, 705/80, 26–27, 37, 39–40; 715/210
See application file for complete search history.

(56) References Cited

U.S. PATENT DOCUMENTS

| | | | | |
|---|---|---|---|---|
| 5,267,155 | A * | 11/1993 | Buchanan et al. | 715/210 |
| 5,272,623 | A * | 12/1993 | Grubb et al. | 717/100 |
| 5,666,493 | A * | 9/1997 | Wojcik et al. | 705/26 |
| 6,311,170 | B1 * | 10/2001 | Embrey | 705/40 |
| 6,442,557 | B1 * | 8/2002 | Buteau et al. | 707/102 |
| 6,453,306 | B1 * | 9/2002 | Quelene | 705/80 |
| 6,920,430 | B1 * | 7/2005 | Berton et al. | 705/26 |
| 7,010,506 | B1 * | 3/2006 | Menon et al. | 705/26 |
| 7,269,656 | B2 * | 9/2007 | Chou et al. | 709/229 |
| 2004/0073507 | A1 * | 4/2004 | Scott et al. | 705/37 |

FOREIGN PATENT DOCUMENTS

JP 2002169709 A * 6/2002

OTHER PUBLICATIONS

Poulis, Nan, "Tame the Tiger: Electronic Forms Coupled with Workflow Management and Support For Client Computers, Can Increase Worker Productivity", Sep. 1992, LAN Magazine, v7, np, p77(5).*

(Continued)

*Primary Examiner*—John W Hayes
*Assistant Examiner*—Freda A Nelson
(74) *Attorney, Agent, or Firm*—David S. Kalmbaugh

(57) ABSTRACT

A computer program which automates and assist various members of an order and approval chain in preparing purchase documents. A requester using the program enters a part number and other information in the purchase document and forwards the document to a processor. The processor checks the purchase document for accuracy and completeness and forwards the document to the approval chain. When each member of the approval chain electronically signs the purchase document is returned to the processor who fills the purchase order.

6 Claims, 9 Drawing Sheets

OTHER PUBLICATIONS

"Leaders In Document Management Industry Endorse PenOp As Standard For Electronic Signature Capture and Verification", Apr. 30, 1997, Business Wire, p301052 (3 pgs).*

"Real-Time Technology and Clearing Services", Jul. 2000, On Wall Street, v10, n7, p118(2).*

Endoso, Joyce, "Defense EDI Program Lacks Leadership Needed To Achieve Cost Savings, GAO Says", Feb. 7, 1994, Government Computer News, v13, n3, p42(2).*

"Defense IRM: Business Strategy Needed For Electronic Data Interchange", Dec. 1993, General Accounting Office reports & Testimony, v199, n12, pN/A (1).*

* cited by examiner

| Requester | Processor | Project | 900 ORDER STATUS | | | Date Printed: xx/xx/xxxx | |
|---|---|---|---|---|---|---|---|
| Order # † | Requester Name Description of Part Part Number | | Name of Processor Vendor Name | Proc Emails To Fin | ---- Approval Chain †† ---- --- Response Dates --- Project Name | Date Ordered Job Order Long Stub Doc # | Date Rec'd Cost |
| 01-900-155 11/08/00 | GREEN 1/2" binder WLJ-362-13W | | HOWARD US OFFICE PROD. | Sec/ | Br/ Fin/ Div/ | | $491.58 |
| 01-900-156 11/08/00 | WHITE Electric Strike, Series 5000 180854875 | | COOMBES Nason's Lock&Safe | | Br/ Fin/ Div/ 11/08 11/13 11/14 | 11/08/2000 M5P10B500001 | 11/09/2000 $120.00 |
| 01-900-157 11/08/00 | GRAY STEERING TIRES CUSTOM HIGH MILE 180854875 | | BORDERS Daniels Tire Service | Sec/ | Br/ Fin/ Div/ 11/08 11/08 | I&M 11/08 | 11/14/2000 $298.08 |
| 01-900-159 11/13/00 | JONES HAND OPERATED PUMP HP121DA85 | | JONES BRAND HYDRAULICS | Sec/ 11/13 | Br/ Fin/ Div/ 11/14 11/15 | I&M 11/16 | N50F0VC21001 $167.60 N50F0VC21001 |
| 01-900-163 11/14/00 | DUNN | | GONZALEZ | Sec/ | Br/ Fin/ Div/ | M5P1TD1C3001 | $0.00 |

† A red border around the Order # box indicates the order is URGENT.
Order # background color: grey = received, yellow = active, red = cancelled.

†† The current Approver category is shown in blue and underlined.
A red, italicized entry indicates rejection.
√ A green checkmark to the right of the chain indicates approval to purchase.

*FIG. 2*

MORE 900 Signature Buttons

Order: 01-900-180     Processor JONES x8459    12/13/2000 = 0348

Requester: DOE, JANE    Code 522320D    Phone X6201

Part # H7240 Headset    Size    Rqrd Delivery Date ▢

Order:    VOX HEAD SET for Mobil Radio    at $819.00   EA for   $0.00

JON                                    Items 2-20:    $0.00

M5P20D100002 Expires: JON NOF UnExp Bal: 0.00   Mat'l: N   Labor: N   Type of Funds:   S & H:   Total   $0.00

26   GO TO

Justification: This has become a safety issue with the Antenna shop. Trying to handle a radio for communications while working on a tower. The David Clark Company Inc.      ☐ Extended Description
                                                          ☐ Sole Source stmt
                                                          ☐ Urgency stmt A form has NOT been printed Order Status Dialog Box   94

1. Below on the left is the APProval CHAIN. When approved, a bold, green checkmark will appear at the bottom left of the chain.
2. The coloered, oblong '...InBox' buttons by each review level, allow you to see those requests pending review at that level/code.

Cost not to Exceed ▢

MATERIAL ORDERING AND REPORTING EXPEDITER (MORE)

This application is a continuation in part of U.S. application Ser. No. 09/760,341, filed Jan. 10, 2001 now abandoned.

BACKGROUND OF THE INVENTION

1. Field of the Invention

The present invention relates to a computer-based networked purchasing management system. More specifically, the Material Ordering and Reporting Expediter (MORE) is a procurement device that uses a Windows-compatible database with either an internet interface or the database server's own interface to partially automate preparing and obtaining approvals on the numerous types of purchasing documents used by an organization or sub unit of an organization.

2. Description of the Prior Art

Electronic transaction and purchasing systems are well known. An electronic transaction or purchasing system typically permits a user to conduct designated transactions or purchases electronically, which substantially improves efficiency and convenience to the user. Examples of electronic transactions or purchases include transactions conducted via computer networks, automated teller machines (ATMs), automated point-of-sale systems, automated library systems, and the like. Transactions and purchases conducted via computer networks may encompass a wide range of transactions, including exchanging information and data via a computer network popularly known as the Internet, e.g., to make a purchase from a vendor on the network. ATMs typically permit users to conduct financial transactions (such as withdrawals, transfers, deposits, and the like) vis-a-vis a financial institution in an electronic manner. Automated point-of-sale systems may be employed by merchants to permit users to purchase products or services using the user's electronic account, and automated library systems may be employed to permit library users to check out and return library materials. Other examples of electronic transaction or purchasing systems are readily available in popular literature and are not enumerated herein for brevity sake.

To provide enhanced security for the user's account, electronic transaction or purchasing systems typically request the user to provide identification data to authenticate himself as the user authorized to approve the proposed transaction or transactions. If the user fails to provide the requested identification data, the proposed transaction or purchase is not authorized and will not be processed. The identification data may be required with each transaction.

In the prior art, users are typically required to manually enter the identification data into the electronic transaction system for authentication. Typically, the entry of identification data involves typing in a password on a numeric keypad or on a keyboard. The identification data is then compared with data previously stored within the electronic transaction or purchasing system, and authentication is satisfied when there is a match. As mentioned previously, the transaction or transactions proposed will not be allowed to proceed if there is no match. More recently, electronic signatures have been used to verify the approval of a transaction or purchase and to act as a security device. Typical examples of the use of electronic signatures can be found in U.S. Pat. No. 5,917,913 issued to Wang on Jun. 19, 1999 and U.S. Pat. No. 6,058,483 issued to Vennel on May 2, 2000.

SUMMARY OF THE INVENTION

The Material Ordering and Reporting Expediter (MORE) partially automates preparing various purchasing documents and obtaining approvals thereon. MORE may select subsets of the data and sort those subsets in a variety of ways for generating reports. Because the typical (signature) approval chain goes to the Division level (a specific sub unit of the organization), MORE is implemented on a Division-by-Division basis. MORE is written in a Windows-compatible database and may be designed to be renewed (that is, recycled to 0 records) at the start of each fiscal year or to keep all fiscal years in a single database table.

Automation occurs at various steps in the process. The program automatically fills in part and vendor information based on a prior order (if any) of the same part number. When a Job Order Number (JON) is entered, the program looks it up in a Master Job Order (MJO) file to validate its existence and suitability for this purchase. The program determines the approval chain based on rules specific to each Division. Once the signature cycle is started, the program automatically e-mails the next Signatory in the chain. When a Signatory approves the order, an electronic signature is affixed to the purchase document. When the last Signatory approves the order, the program automatically e-mails the within-Division buyer, called a Processor in the MORE program, that the order is approved for purchase. Only then does the Processor print out a hard copy of the purchase document.

The MORE program allows for three classes of users: (1) Requesters: people who need something—a tool, a part, a contract—to complete a task; (2) Processors (i.e. within-Division buyers); and (3) Signatories: supervisors and financial personnel with approving authority.

A preferred embodiment of the present invention is a computer-based system for coordinating a purchase document and approving the purchase by one or more Signatories of an approval chain. First, the program of the current invention provides a means for creating the purchase document by a Requester. Next, the program provides a means for determining the approval chain for the purchase document. Next, the program provides a means for notifying a Processor of the purchase document. The Processor reviews the purchase document for completeness and accuracy and upon finding the purchase document to be complete and accurate, the Processor forwards the purchase document to the program-determined approval chain. Next, the program provides a means for sequentially notifying each of the Signatories in the approval chain and then each of the Signatories approve the purchase by clicking a button that affixes an electronic signature to the purchase document prior to automatically sending the purchase document to the next Signatory in the approval chain. Next, the program provides a means for notifying the Processor of approval of the purchase document, after the final Signatory in the approval chain approves the purchase document. Next, the program provides a means for printing a purchase document. The purchase document form contains information relevant to the purchase and the electronic signature of each of the Signatories in the approval chain.

The general flow of the program is described below with the likely user class listed in parenthesis.

(1) Creating a New Order (Requester):

Requesters submit a request for a Material purchase by Creating a New Order that describes the item or items needed and then pressing a pale, yellow on-screen button that e-mails a "processor", i.e. a within-Division buyer, to examine the order for completeness and route it for electronic signatures. Each requester "in the system" has a default processor, but alternate processors are selectable.

(2) Responding to Orders Pending Approval (Processor):

The Processor is, in essence, the first approver. Only after the Processor has reviewed an Order and found it acceptable, is it routed to the Signatories for (electronic) signatures.

(3) Responding to Orders Pending Approval (Signatory):

The Program determines the approval chain (based on rules specific to each Division) and e-mails the first signatory in response to the processor clicking a large, green, on-screen button that the order is complete. Each signature category has an "In Box" button that finds all the order requests awaiting that person's review.

Each Signatory has a unique password and an approval button with the Signatory's name on it that only that password operates. As each Signatory approves an order (thereby affixing an electronic signature), the program automatically e-mails the next Signatory in the chain, such as a supervisor or a financial overseer. When the last person in the chain approves the order, the Processor receives automatic e-mail that the order is approved for purchase. Each signature category has a single reject button that all passwords in that category operate. When rejecting an order, the Signatory may explain why in the "Order Status Dialog Box". Clicking the Reject button puts the rejecter's name next to the Reject button and automatically generates an e-mail to the Processor, with a cc: to the Requester, that the order is being rejected.

(4) Checking the Status of Open Orders (Requester and Processor):

Requesters (and Processors) may follow the progress of an order through the (within-Division) approval chain by checking the status of open orders. Received and canceled orders are not listed. The Order Status screen shows the complete approval chain, in orders date stamps when a Signatory responded, and uses color-coding to indicate who approved the order last.

(5) Making the Purchase (Processor):

When the Processor receives the "approved for purchase" e-mail, the Processor clicks a single button that prints out the form appropriate for this purchase. Electronic signatures of those individuals who approved the purchase will be affixed to the form. At this point, the purchase follows established purchasing rules for the organization.

(6) Generating a Report (Requester, Processor, Signatory):

The MORE program can generate a number of canned reports that provide subtotals and totals by Requester, by Processor, by Project, by JON, or by different levels of organization Code. These reports can be for the entire fiscal year or for a specified time span within the year. The reports can be for a single Requester, Processor, Project, JON or Code, or for all in the category, or for a subset in the category. When a report has more than one individual/item per category, there are subtotals on an individual/item basis with a rollup for all in the selected set/subset.

The MORE program also has certain capabilities which allow the user to expedite a procurement. The More program allows the user to purchase a product or service without full and open competition when certain criteria are met including the preparation of a sole source justification/statement. The More program also provides for an urgency statement which the user prepares to expedite the procurement process when time is of the essence in acquiring the product or service to the acquiring activity.

One object of a preferred embodiment of the present invention is to provide automatic e-mails that expedite the approval process and "In Box" buttons that prevent orders from being forgotten.

Another object of a preferred embodiment of the present invention is to provide the Requester with a common interface regardless of the type of purchase that will be pursued. Details of the procurement system not pertinent to the Requester are handled by the Processor. For purchases from the same vendor with the same JON, the program allows easy entry of an unlimited number of items on a single buy.

Another object of a preferred embodiment of the present invention is to provide a common interface that works for the Processor as well the Requester. Both have a consistency/uniformity of data entry that may have been lacking before. If all Requesters access the system to place their orders, undecipherable, hand-written requests become a thing of the past.

Another object of a preferred embodiment of the present invention is to provide a computer-based system where if (Vendor) internet sites were used in the previous purchase of the same item, they are cited for easy referral to the current purchase. Easy referral means the user clicks a button that opens the browser and goes to that site.

Another object of a preferred embodiment of the present invention is to provide a computer-based system with a link to the Fed Log program. Fed Log tells the user which supply centers in the Federal Supply System carry which items and gives details as to size, electrical characteristics, etc. MORE even presents how to create a custom screen in Fed Log to display the information the user wants and only that information. A custom screen makes it easy to cut and paste between the two programs.

BRIEF DESCRIPTION OF THE DRAWINGS

FIG. 2 is a pictorial representation of the of the Order Status Screen of a preferred embodiment of the present invention, which includes help features and explanatory text of a preferred embodiment of the present invention;

FIG. 3A is a pictorial representation of the top half portion of the Signature Buttons screen of a preferred embodiment of the present invention, which includes help features and explanatory text of a preferred embodiment of the present invention;

FIG. 4 is a pictorial representation of the left side portion of the Processor Page screen of a preferred embodiment of the present invention, which includes help features and explanatory text of a preferred embodiment of the present invention;

DETAILED DESCRIPTION OF THE PREFERRED EMBODIMENTS

The Material Ordering and Reporting Expediter (hereinafter "MORE") program partially automates the preparation of purchase order documents used by the Department of Defense and other Government agencies. MORE may select subsets of the data and sort those subsets in a variety of ways for generating reports. Purchasing is expedited by automatic data fill-in based on a prior order, if any, of the same part number, automatic validation of the Job Order Number, and program determination of the approval chain with automatic e-mailing to the next Signatory when approval is granted. Electronic Signatures are affixed when a Signatory clicks the applicable password-controlled approval button.

Most organizations have an approval chain specific to the organization or a division thereof. For each order, MORE determines the approval chain based on rules specific to the organization. In addition, MORE can determine the approval chain of a division within an organization. This feature enables the program to automatically e-mail the next Signatory in the approval chain of a division once the signature cycle has been started, and to e-mail the Processor when approval to purchase is granted.

To better describe the operation of the procurement management system of the present invention, the utility will be described as it pertains to purchasing documents used at the Naval Air Warfare Center Weapons Division at China Lake, Calif. and Point Mugu, Calif. These documents are the 6-part Short Stub, Long Stub, a work sheet for a government Bankcard purchase, and the China Lake site Long Stub. The Material Ordering and Reporting Expediter is a Windows-compatible database that partially automates preparing purchase order documents, such as:

1) the DD Form 1348 (6 PT) Requisition Document (hereinafter "the Short Stub"),
2) the DD Form 1348-6 Requisition Document (hereinafter "the Long Stub"),
3) a Work Sheet for a government Bankcard purchase,
4) the China Lake 4491/1 (9 PT) Requisition Document.

Data may be organized, that is filtered and sorted, by Processor (the person who processes the order, either a Credit Card Holder or someone who handles stubs), Requester, Job Order Number, Project, Organization Code, time span, etc. Combinations of the preceding are also possible. The ability to organize data and to total and subtotal the data on that basis allows for a number of useful reports to be generated. In a preferred embodiment of the present invention, various colors are used to assist the user in identifying the various choices available on a screen and information required by the program.

Figure 3B:
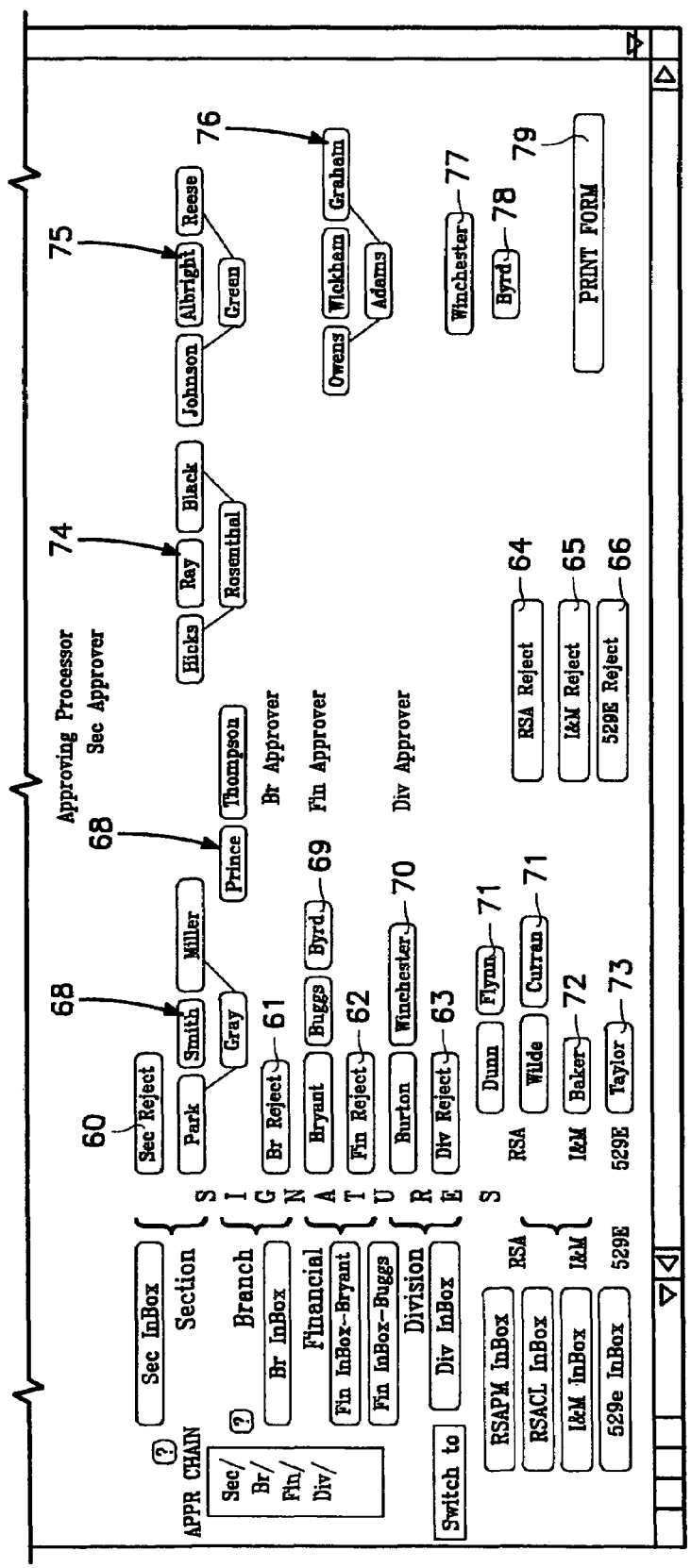
FIG. 3B is a pictorial representation of the bottom half portion of the Signature Buttons screen of a preferred embodiment of the present invention, which includes help features and explanatory text of a preferred embodiment of the present invention.

Referring to FIGS. 3A and 3B, an active "OnOrder" table contains all orders submitted in a current fiscal year (FY). (As a new fiscal year approaches, a new, empty table is created for the new fiscal year. For example, when used in government organizations, on about 1 October, the active "OnOrder" table is renamed "OnOrderFY," where FY represents the last two digits of its fiscal year.) This "OnOrder" table is used to enter new orders, to obtain approvals of those orders, and to review the status of those existing orders. At the same time, the Signatories review and respond to the order by approving or rejecting the order. If a signatory chooses to reject the order, the signatory may give the reason why in the Order Status Dialog Box 94. Clicking a red Reject button 60, 61, 62, 63, 64, 65 and/or 66 initiates e-mail to both the Processor and the Requester.

If approval is given, a check mark is placed next to the signatory's name on an approval button; the signatory's electronic signature is affixed to the form. An e-mail to the next signatory, such as the Division's Budget Analyst, is automatically generated. Similar e-mails are generated as the order goes from the Budget Analyst, block 69, to the Division Head, and from the Division Head to a funds overseer, if any.

The software is programmed to know the last stop in the approval chain, and when the last signatory approves, the program automatically generates an e-mail to the Processor that approval to purchase has been granted.

1. Initial Set Up for using the MORE Program.

To efficiently use the MORE program, a user must first identify himself or herself to the program. Recognized MORE Users have their name added to a list on the opening screen; the user then scrolls this list to select his or her name. However, if the user enters his or her name into the program's "User Name" exactly as the MORE program has it, no scrolling will be needed. In general, MORE uses the user's name as it appears in the e-mail program's Address Book. Typically, the format is: Last Name, First Name Initial. There is only one (1) comma, and there is no period after the Initial. For example, "Smith, John L" might be an entry.

After the user has the precise name (no comma between First Name and Initial), the user opens the program on the user's computer. From a pull-down menu bar near the top of the screen, the user selects the Edit pull-down menu. At the bottom of the list, Preferences is selected, then Application. In the User Name box, the user enters the user's name.

2. Starting the MORE Program

Double clicking the Desktop starter file icon launches the internet interface and the database program and opens the Material Ordering and Reporting Expediter (MORE) "Main-Menu" file. This initial screen asks the user to verify identifying information, specifically his/her name and Code. If the user name is not highlighted when the file opens, the user scrolls the list to the user name.

Next, the user selects from creating a new order, checking order status, responding to an order, generating a report, or quitting the program. Quitting the program closes all MORE database tables. These choices are available at almost all stages of the MORE program. The user uses a mouse to make the selection. Unless the user elects to quit, the program opens the "OnOrder" database table and a database table containing Job Order Number (JON) information.

Figure 1A:
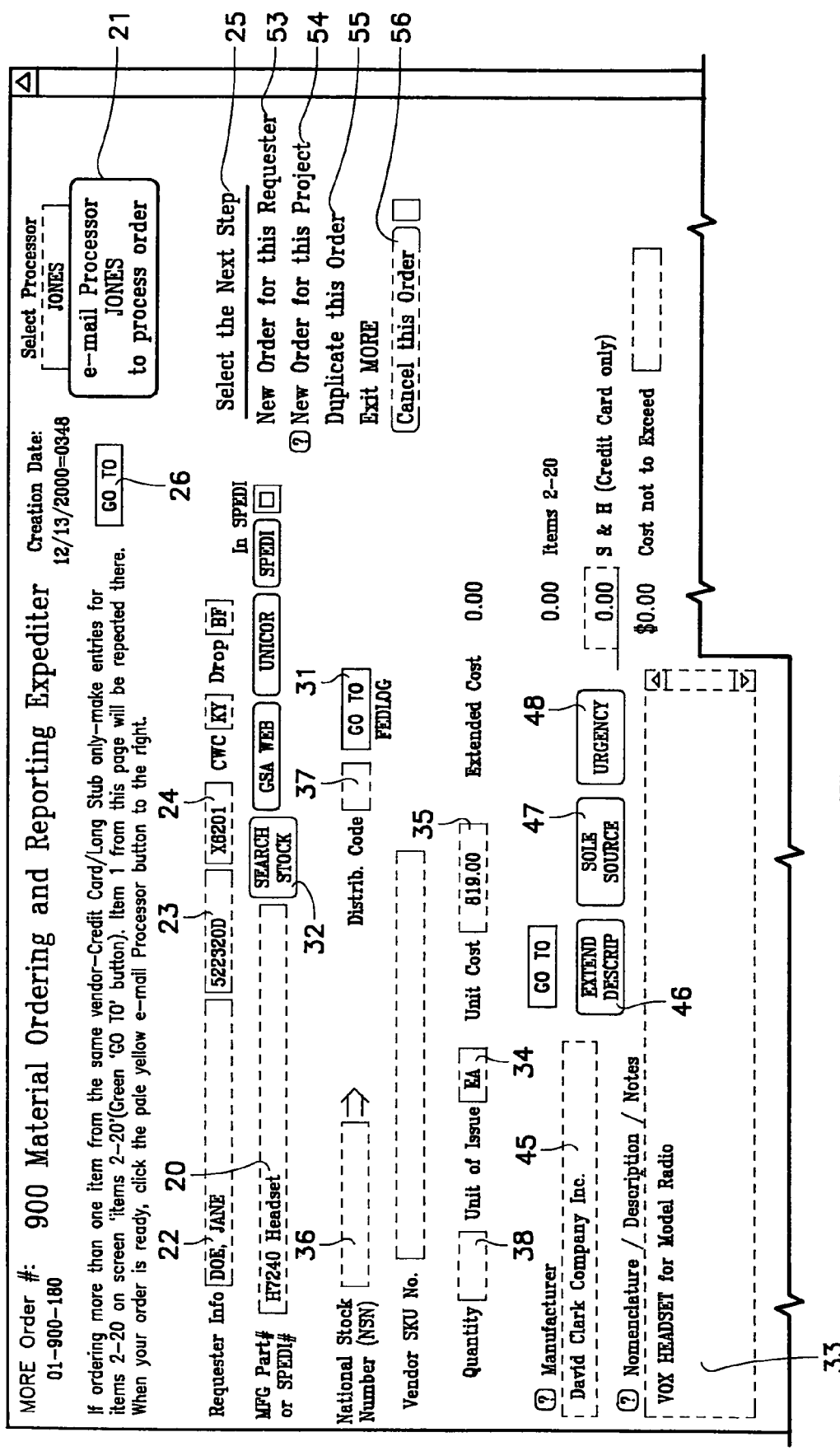
FIG. 1A is a pictorial representation of the top half portion of the Item 1 screen of a preferred embodiment of the present invention, which includes help features and explanatory text of a preferred embodiment of the present invention.
Figure 1B:
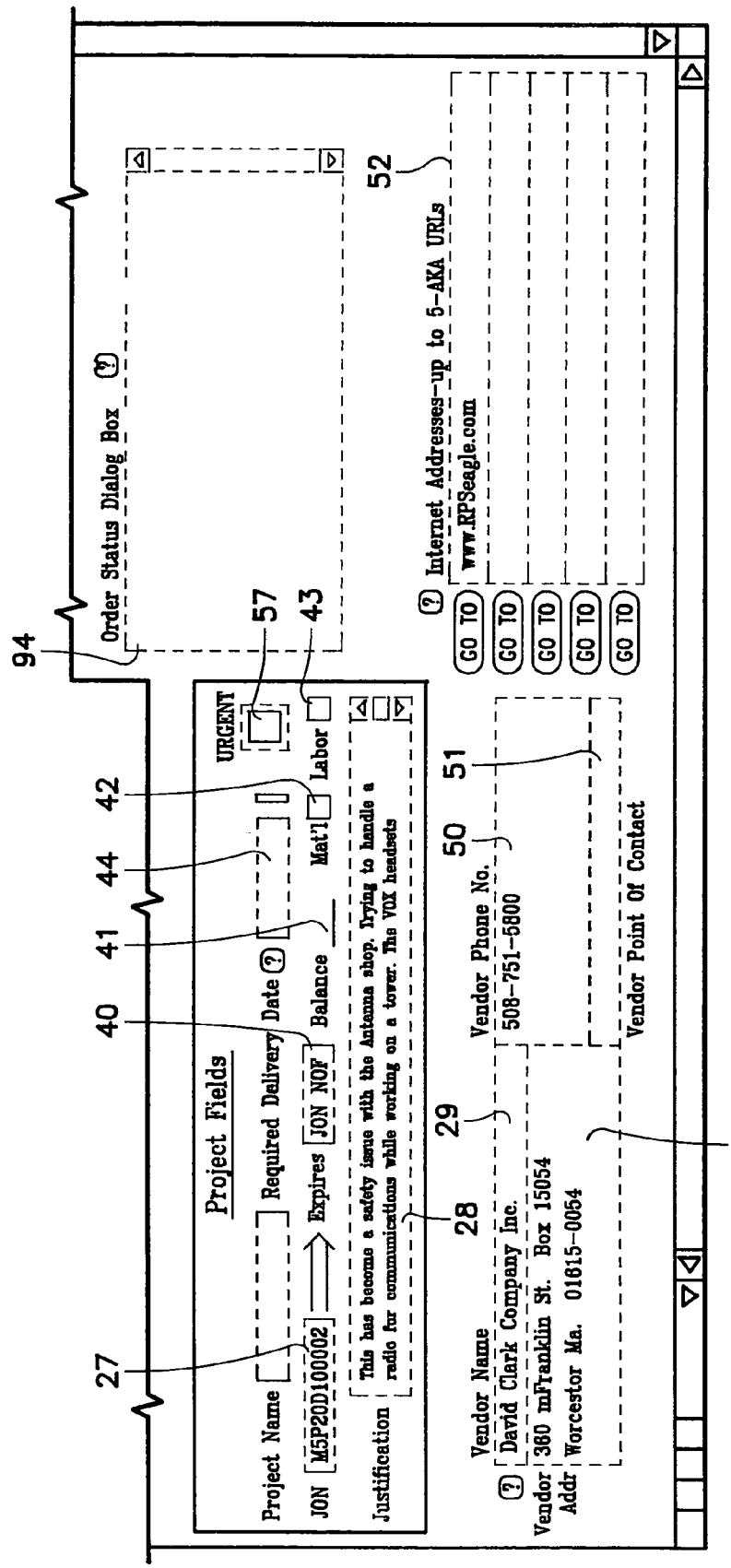
FIG. 1B is a pictorial representation of the bottom half portion of the Item 1 screen of a preferred embodiment of the present invention, which includes help features and explanatory text of a preferred embodiment of the present invention.

Referring to FIGS. 1A and 1B, which illustrate the MORE Item 1 screen, once the "Onorder" table is open, three new order options are available under "Select the Next Step" 25: "New Order for this Requester" 53, "New Order for this Project" 54, "and " "Duplicate this Order" 55. Also among the " . . . Next Step" choices is "Cancel this Order" 56.

In the "OnOrder" table there are four (4) screens of primary interest to the general MORE user. They are:

Item 1, Order Status, Reports and Signature Buttons.

FIGS. 1A and 1B display the "Item 1" screen. That screen and the other three (3) screens mentioned are choices on the "GO TO" navigation button 26 toward the upper right of the Item 1 screen of FIG. 1A. This location of the "GO TO" button is repeated on all four (4) of the screens. As noted earlier, various colors may be incorporated into each screen to assist the user. For example, in a preferred embodiment of the present invention, the "GO TO" navigation button is green.

The function of each of the main screens of interest may be summarized as follows:

Item 1 (FIGS. 1A and 1B)—Requesters perform data entry for the items to be purchased. Information pertinent to all items includes JON (Job Order Number) block 27, justification block 28, and Vendor block 29. For each individual line item, Requesters enter descriptive and pricing information. Processors validate entries on this screen.

Signature Buttons (FIGS. 3A and 3B)—Signatories review a summary of the order and respond (approve or reject) by clicking a button with their name or clicking a single red Reject button for their category/level. These button clicks generate automatic e-mails, and if approval is given, affix electronic signatures. Signature buttons include buttons 68, 69, 70, 71, 72, 73, 74, 75, 76, 77 and 78 and Reject buttons include buttons 60, 61, 62, 63, 64, 65 and 66.

Order Status (FIG. 2)—Anyone may view a color-coded representation of where in the approval chain orders are. If approved for purchase, date ordered and date delivered may be shown.

Reports—Anyone may generate any of a variety of reports by clicking a button and following instructions given in pop-up information boxes.

There are two primary reasons to look at a prior order: (1) to check the status of the order, or (2) to obtain pertinent information for a new order. When a user clicks "Check Status of Open Orders" on the Main Menu, the user is directed to the Order Status screen (FIG. 2) of the "OnOrder" database table. The program automatically clicks the orange "Requester" button 112, enters the user's name that it copied from the Main Menu, and clicks "Continue" to generate the list of orders the user has submitted this fiscal year that have not been marked as received or canceled, i.e. that are still active. Each order number has a background color indicating its status: yellow indicates active, red indicates canceled, gray indicates received. The user clicks the upper or lower page in the spiral-bound flip book in the upper left (not shown) to move to the record/order of interest. If the order vehicle is a long stub, a blue Document Number will appear on the far right of the line. The user clicks on the NAFI (Navy Air Force Interface) button to see the procurement status of the order. If the user already has a NAFI account, the user logs in and enters the Document Number. If the user does not have an account, the user clicks the button to establish an account in NAFI.

If the purpose of reviewing the order was to check its status because the Processor notified the Requester of a problem, the Requester needs to correct the problem or provide clarifying information. In either case, the Requester clicks the "GO TO" button 26 (FIG. 1A) and then selects "GO TO Item 1" to access that layout. The Requester should use the on-screen Order Status Dialog Box 94, illustrated in FIG. 1B, to describe the action/response and then click the pale-yellow, on-screen button 21, illustrated in FIG. 1A, to e-mail the Processor to process the order.

Data entry for a new order is greatly reduced if the Requester knows the part number of the item(s). If a part number is not known, the Requester may search the OnOrder database table based on nomenclature, manufacturer, description, etc., to find a prior order. In this case, the Requester does not click the orange "Requester" button 112 (FIG. 2). Instead, the Requester immediately clicks the green "GO TO" button 26 (FIG. 1A) and then selects "GO TO Item 1", as illustrated in FIGS. 1A and 1B.

When on that layout, the Requester selects "View" from the pull-down menus, followed by "Find Mode" and then enters the known information in the appropriate fields. After clicking "Find" on the left in the gray Status Area, the Requester may scroll through the records found. If the desired item is found, its part number may be highlighted and copied to the clipboard.

The Requester should then select the "New Order for this Requester" option in the "Select the Next Step" radio buttons. The software creates a new record and places the cursor in the Part Number field block 20 (FIG. 1A). Then, the Requester may paste in the part number and let the software automatically fill-in many of the fields. If the item is not found in the OnOrder database table, the Requester may search the Stock database by pressing the green "Search Stock" button 32 (FIG. 1A). Then, the Requester follows the same procedure as searching the OnOrder database table, but when finished searching, clicks the "Return to OnOrder" button. If the search succeeded and the Requester copied the part number to the clipboard, after "New Order for this Requester" is selected, the part number is pasted. If the search did not succeed, the Requester must perform all the data entry.

Referring to FIGS. 1A and 1B, in a preferred embodiment of the present invention, when creating a new order, the first entry on the "Item 1" screen, illustrated in FIGS. 1A and 1B, is the Part Number block 20. This entry triggers a lookup in the Stock database to see if that item has been ordered before. If so, the program will fill in those fields expected to be the same, which are the Nomenclature block 33, Unit of Issue block 34, Unit Cost block 35, National Stock Number block 36, and Distribution Code block 37. The MORE program will also fill in Manufacturer, and Vendor information. The program does not fill in the Quantity. The Requester reviews the "Item 1" screen to fill in and/or change any fields that need to be changed, including those fields that were filled in by the program.

In a preferred embodiment of the present invention, when the user enters the 11-character Job Order Number (JON) block 27, the program will look it up in a Master Job Order (MJO) file to validate the JON. The program checks that the JON is in the MJO file, that the JON is open on this date, that the JON has a positive funds balance, and that the JON is open for purchasing material. This information is indicated to the right of the JON. The "Expires" field 40 will contain either the expiration date of the funds (which confirms that the JON is in the file and will tell the user if the JON is open or not) or the words JON NOF, where NOF means Not On File. A blank in the balance field 41 indicates a positive balance. A red "$–" in the balance field 41 means the JON is "in the red". The Material field (Mat'l) 42 is either Y or N, for Yes or No on being open for material. If the JON fails any of these checks, the user will be allowed to continue making entries, but the Processor will not process the submittal until the deficiency is corrected or a satisfactory JON is provided.

The item(s) is(are) added to the "Stock" database the first time the Requester e-mails this order to the processor. All fields on the "Item 1" screen and a brief description of the function are listed as follows, as illustrated in FIGS. 1A and 1B:

Part Number block 20—typically the Manufacturer's Part Number, but may be the Vendor's Part Number or Vendor SKU. This field should be the first entry because it triggers a lookup in the Stock database table to automatically fill in several other fields;

National Stock Number (NSN) block 36—The 13-digit number issued to national/federal stock items. The format is: nnnn-nn-nnn-nnnn. This field is often left blank; Distribution Code block 37—This 2 or 3-character code designates the source of supply for NSN items. The correct code is found when using one of the computer databases for federal stock items, e.g. Fed Log.

Nomenclature block 33—A brief description of the item. The first line should be very general/high level and the lines that follow more descriptive. This entry is limited to roughly 44 characters.

Quantity block 38—The quantity of this item the Requester wishes to order;

Unit of Issue block 34—The Requester selects the correct 2-character abbreviation from the list that appears when tabbing or clicking into the field;

Unit Cost block 35—The cost per unit of issue. The program will multiple the Unit Cost by the Quantity to determine the extended cost;

Job Order Number block 27—The organizational JON;

Funds Expire block 40—The software will automatically fill this in when it looks up the JON in the Master Job Order file. If the JON does not exist, JON NOF appears;

Required Delivery Date block 44—a date (mm/dd/yy) is entered when the Requester needs the item; the date may be especially important for end-of-year purchases. If a date is not entered, the software creates this date when the order is printed. It is the date of printing+30 days;

Justification block 28—A brief explanation of why this purchase is necessary;

Manufacturer block 45—The name of the manufacturer of the part to be ordered.

(Extended) Description/Notes block 46—List of special features are entered here, e.g. technical, electrical, and physical characteristics. The user should try not to repeat the same words listed in the part number field. This field is large to allow for the listing of all the special features associated with the item to be purchased. If the purchase is via a long stub or if the type exceeds the space on the appropriate form, the program will print the entire description on a separate sheet (or sheets) of length up to 4 pages;

Vendor Name block 29, Vendor Addr block 49, Vendor Phone block 50, and Vendor point of contact (POC) block 51—The user should list the suggested sources of supply here. Sometimes a vendor has a different part number than the manufacturer. If so, the user may list the vendor's part number next to the name to eliminate confusion. If the total cost is more than $2500, the user may furnish two or more sources. The user needs to make entries in the name, address, phone number, and point of contact fields if known. A separate page may be needed to eliminate confusion on a crowded stub. Therefore, the vendors are automatically printed on the separate, extended description sheet;

Order Status Dialog Box block 94—This box provides a place for the Requester and Processor to conduct a dialog concerning the status of the order; and Internet Addresses block 52—The Universal Resource Locators (URLs) block provides Internet addresses for potential suppliers. Typically, these correspond to entries in the Vendor Name. They are treated as hyperlinks, and clicking the "GO TO" buttons to their left will launch a browser (if not already open) and go to the designated web site.

For each additional line item in the order, the Requester enters the Part Number, Nomenclature, (Extended) Description, Manufacturer, Unit of Issue, Quantity, and Unit Cost. When all entries are completed, the Requester clicks the pale-yellow on-screen button 21 to e-mail the Processor that an order is pending. If the usual Processor is not available, the Requester may use the drop-down list above the e-mail button to select a different processor for an order. If the order is urgent, the Requester clicks the red URGENT checkbox 57 to the right of the required delivery date to have an "URGENT" statement included at the beginning of the e-mail message. If the Requester does not enter a part number or a National Stock Number (NSN), and does not attempt to describe the item, the program will not issue the e-mail, but will request either a part number or further description of the item.

When a Requester creates a new order from the MainMenu or from the "New Order for this Requester" button 53 in the "OnOrder" database table, the MORE program automatically fills in the information pertaining to the selected Requester, but nothing else. In the "OnOrder" table there is a second option under "Select the Next Step" 25, which is "New Order for this Project" 54. When the Requester clicks button 54, in addition to the requester information, the Project Name, Urgency Indicator 57, JON 27, Required Delivery Date 44, and Justification 28 are automatically duplicated in the new request. The "New Order for this Project" button 54 is useful when ordering many parts for a specific project, especially if the parts are in the federal supply system, which requires a separate short stub for each part. When creating a new order, there is a third option: the "Duplicate this Order" button 55. A new record is created with all the Requester entries from this record duplicated. That is, in addition to the requester and project information, the descriptive and pricing information for each line item is duplicated. This method is useful if the changes required are less than making all the non-automatic entries from scratch. The "Cancel this Order" button 56 is utilized by the Requester to abort an order.

To exit the program, a user may click the "Exit MORE" radio button in the "Select the Next Step" set of options 25. All MORE database tables are closed.

Referring to FIGS. 3A and 3B, the Signature Buttons screen contains several sets of password-controlled buttons 68, 69, 70, 71, 72, 73, 74, 75, 76, 77 and 78 that signatories click to affix their electronic signature to the appropriate form. The password given to "Stand-ins" will operate the button 68, 69, 70, 71, 72, 73, 74, 75, 76, 77 or 78, to affix the signatory's signature, but on the forms the signature will be preceded by the Stand-in's initials and the word "for". On the Signature Buttons screen, the Stand-in's full name will appear as the Approver rather than the permanent signatory's name. Right above the block of buttons is a condensed version of the order information. The order information is intended to be sufficient for the signers to decide whether to approve or reject the order. When someone "signs off", the next higher level signatory is notified automatically and a check mark is placed to the right of the individual's name on his/her approval button. When the final approver in the chain clicks "yes", the Processor is e-mailed that the order is approved for purchase. Thus, the Processor will know when it is time to print the appropriate hard copy and proceed with the purchase.

When the Processor places the order, he/she may enter data into fields indicating who placed the order, when it was placed, and when delivery is expected. Clicking an on-screen button automatically e-mails this information to the Requester. The date ordered is displayed on the Order Status screen. When the order is delivered, the Processor may enter the quantity received, actual cost, received date, and the recipient. Clicking an on-screen button automatically e-mails this information to the Requester. When this button is clicked the program changes the order status from "active" (yellow background color on the order number) to "received" (gray background color on the order number). The date delivered is displayed on the Order Status screen under "Date Rec'd".

Figure 4:
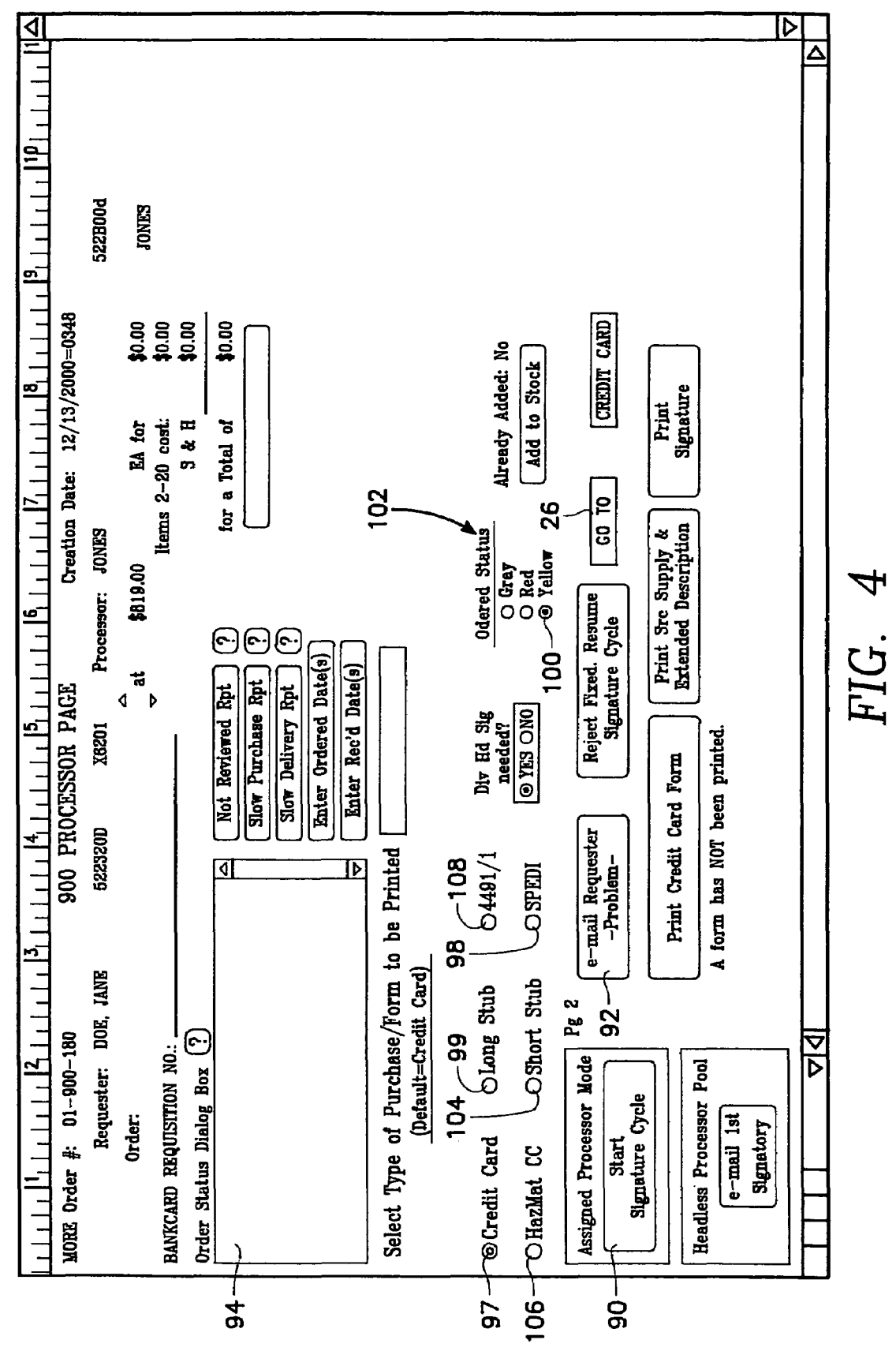

The Processor clicks the green "GO TO" button and then selects "GO TO Processor Page" to go to the "Processor Page" layout, which is illustrated in FIG. 4. This layout has the same "GO TO" button 26 to easily navigate to the "Item 1" screen, to the "Signature Buttons", to the "Order Status", and to the "Reports" screen. The Requester's name and order are repeated on the Processor Page for the processor to know what order is being processed.

The Processor then selects the form to print, for example credit card 97, short stub 104, long stub 99, or 4491/1 108. This selection assures that when the time is right to print a hard copy, the right form is printed. There is a line for Shipping and Handling (S&H) charges if it is a credit card order. Any problems the Processor sees with the order are described in the Order Status Dialog Box 94.

After the Processor has decided whether or not there are problems with the order, the Processor presses the appropriate button (Success or Problem) to e-mail the Requester.

The Reports screen (not shown) is used to generate a variety of reports. A three-line format is used for each order that is reported. A row of buttons along the top left of the screen allow the user to select and sort data by Processor, by Requester, by Job Order Number, by Code, and by Project.

The Processor is responsible for verifying and/or filling in many fields. Many of these fields, which are related to stub purchases, are selectable from drop-down lists. For example, the Unit of Issue 34 (FIG. 1A) contained in columns 23-24 of both the Long Stub and the Short Stub is an abbreviation of the types of units under which material is issued. The following Table presents typical examples of 2-character abbreviations from the list that appears when tabbing or clicking into the Unit of Issue field.

TABLE I

| Code | Description |
| --- | --- |
| AM | Ampoule |
| AT | Assortment |
| AY | Assembly |
| BA | Ball |
| BD | Bundle |
| BE | Bale |
| BF | Board Foot |
| BG | Bag |
| BK | Book |
| BL | Barrel |
| BO | Bolt |
| BR | Bar |
| BT | Bottle |
| BX | Box |
| CA | Cartridge |
| CB | Carboy |
| CD | Cubic Yard |
| CE | Cone |
| CF | Cubic Foot |
| CK | Cake |
| CL | Coil |
| CN | Can |
| CO | Container |
| CY | Cylinder |
| CZ | Cubic Meter |
| DR | Drum |
| DZ | Dozen |
| EA | Each |
| FT | Foot |
| FV | Five |
| FY | Fifty |
| GL | Gallon |
| GP | Group |

TABLE I-continued

| Code | Description |
| --- | --- |
| GR | Gross |
| HD | Hundred |
| HK | Hank |
| IN | Inch |
| SF | Square Foot |
| JR | Jar |
| KT | Kit |
| LB | Pound |
| LG | Length |
| LI | Liter |
| MC | Thousand Ft$^3$ |
| ME | Meal |
| MR | Meter |
| MX | Thousand |
| OT | Outfit |
| OZ | Ounce |
| PD | Pad |
| PG | Package |
| PM | Plate |
| PR | Pair |
| PT | Pint |
| PZ | Packet |
| QT | Quart |
| RA | Ration |
| RL | Reel |
| RM | Ream |
| RO | Roll |
| SD | Skid |
| SE | Set |
| SH | Sheet |
| SK | Skein |
| SL | Spool |
| SO | Shot |
| SP | Strip |
| SX | Stick |
| SY | Square Yard |
| TD | Twenty-four |
| TE | Ten |
| TF | Twenty-five |
| TN | Ton |
| TO | Troy Ounce |
| TS | Thirty-six |
| TU | Tube |
| VI | Vial |
| YD | Yard |

The 2 or 3-character Distribution Code 37 (FIG. 1A) designates the source of supply for NSN items, which are procured via a short stub. In the Defense Logistics Agency Customer Assistance Handbook it is called the Routing Identifier Code (RIC). NAWCWPNS personnel choose from the "NAVY COG" column. Several popular choices are:

9N Defense Supply Center, Columbus (electronics)

9G Defense Supply Center, Richmond Va.

9Q GSA, DC

9Z Defense Industrial Supply Center

The correct code is found when using one of the computer databases for federal stock items, e.g. Fed Log.

Priority is a 2-digit code related to MILSTRIP Force/Activity Designators (F/AD) and is used on both the short stub and long stub. RDT&E in general, and NAWCWD's 5.2 Department in particular tend to use F/AD IV, encompassing priorities 07/09/14. The lower the Priority Number the quicker the response. Specific projects may be authorized a lower-numbered F/AD.

Priority 07 indicates a work stoppage has occurred on mission-essential tasks or equipment;

Priority 09 indicates a work stoppage will occur to a mission-essential task or equipment; and Priority 14 indicates routine requirements, replacement of stock, or scheduled maintenance.

If the user has a customer with authority to use a higher priority, a memo is attached authorizing use of that priority signed by an official from that code or division. Table II presents examples of Priority designators used for the United States (US) and Overseas (OS).

TABLE II

| F/AD | Urgency Designator A | Urgency Designator B | Urgency Designator C |
|---|---|---|---|
| I | 01 | 04 | 11 |
| II | 02 | 05 | 12 |
| III | 03 | 06 | 13 |
| IV | 07 | 09 | 14 |
|  | US: 12 days | US: 31 days | US: 31 day |
|  | OS: 16-17 days | OS: 69-84 days | OS: 69-84 days |
| V | 08 | 10 | 15 |

The Urgency Designators in TABLE II are defined as follows:

Designator A is requirements for material without which the activity concerned is unable to perform an assigned mission, or to eliminate an existing work stoppage of the repair of mission-essential equipment;

Designator B is requirement for material, the lack of which is impairing the operational capability of the activity concerned, or is anticipated to cause work stoppage in performing maintenance of mission-essential equipment; and Designator C is routine requirements, replacement of stock, scheduled maintenance.

Project Codes are used on both the short stub and the long stub to characterize how and why this material will be used. The following Table presents typical Project Codes used in a preferred embodiment of the present invention. Each position of this 3-character code is sub-coded.

TABLE III

General Usage Project Codes

| 1st Position | 2nd Position | 3rd Position |
|---|---|---|
| A Aircraft & ground support equip | A Allowance-Self Support Increase Range | 0 CASREP/ NMCS |
| F Fleet Ballistic Missile Program | R Repair-Unscheduled | 1 Work Stoppage |
| L Other Fleet Units | L Repair-Scheduled | 2 Restricts Operation |
| P CNO Special Projects | M Overhaul-Unscheduled | 3 Shortage |
| S Repair & Overhaul Shops | N Overhaul-Scheduled | 4 Management Program |
| T Experimental, Test, and Research Programs/ Organizations | O Maintenance-Technical | 5 Customer Program |
|  | S Production/ Manufacture | 7 Capability impaired for lack of parts |
| Y Miscellaneous-Not otherwise categorized | Y Miscellaneous-Not otherwise defined | 8 Government furnished material |
| Z Special Programs | Z Disposal Programs | 9 Miscellaneous not otherwise categorized |

Both the short stub and long stub have a field for the 2-character Advice Code. The Processor uses these optional advice codes to communicate to the person in the Supply Department requirements of the purchase. These requirements relate to substitution of similar items/material, configuration of the items/material, and allowed pricing differential. Table IV presents Advice Codes frequently used on short stubs and long stubs.

TABLE IV

Advice Codes for Federal Stock

| Code | Explanation |
|---|---|
| 2B | Only requested item will suffice. Do not substitute/interchange. Also applies to "Obsolete"/ "Inactivated" item previously rejected with Status Code CJ. |
| 2C | Do not back order. Reject any unfilled quantity not available to meet SDD/RDD. Suitable substitute acceptable. |
| 2J | Do not substitute or back order any unfilled quantities. |
| 2L | Entry in quantity field exceeds normal demands; however, this is a confirmed valid requirement. |
| 2N | Item required in one continuous length as expressed in rp 25–29 and unit of issue in rp 23–24. No other configuration is acceptable and/or multiples of the unit pack are not acceptable. |
| 2P | Initial requirement certification. Requested item is a mandatory turn-in repairable required for initial outfitting/installation or increased allowance/stockage objective; therefore, no unserviceable unit is available for turn-in. Requires memo explaining why we have no turn-in. |
| J1 | Requester authorizes buyer to pay up to 10% higher price without calling for approval. |

In a preferred embodiment of the present invention, an order's status is updated after a credit card order has been placed or a long or short stub has been sent to Supply. The Processor may access the necessary fields to update the order's status by opening the MORE Program, navigating to the Item 1 screen or Signature Buttons screen or Processor Page screen, and selecting the appropriate order number. If the purchase is a credit card buy, the Processor enters the name of the individual who bought the item, the date the order was placed, and the estimated date of delivery. If there was a change in price or a different vendor chosen, the Processor may enter this new information also. If it is a long or short stub, the Processor enters the date the stub was sent to Supply and the estimated date of delivery. If any new information comes to the attention of the Processor, such as the Purchase Order Number or Bankcard Purchase Log Number, that information may be added as well. After updating the order's status, the Processor clicks the yellow "E-mail Order Placed" button so that the new information will be forwarded to the requester.

In a preferred embodiment of the present invention, when an order is received, this information is entered on the Item 1 screen or Signature Buttons screen or Processor Page screen. The Processor/Receiver enters the quantity received, the total price, and the date received. The requester is notified of this change in status when the "E-mail Order Rec'd" button is clicked. Clicking the "E-mail Order Rec'd" button changes the background color of the MORE Order Number from yellow (active) to gray (received). If the user clicked the "Cancel This Order" button 56 on the Item 1 screen, the background color will be red to indicate cancellation. If the order has been cancelled for any other reason, the buyer can change the More Order Number to red by selecting the "Red" circle button on the Signature Buttons screen.

In a preferred embodiment of the present invention, each display screen needed in processing MORE orders has a drop down entry on the green "GO TO" navigation button 26 (FIG.

1A). These choices make it easy to move around in the program. Item 1 displays the first screen, illustrated in FIGS. 1A and 1B, of the order. This screen is used by the Requester to enter ordering data. The program adds the shipping charges to the extended costs to calculate the total cost and enter it on the Item 1 screen.

The Signature Buttons screen, illustrated in FIGS. 3A and 3B, displays the Signatory buttons 68, 69, 70, 71, 72, 73, 74, 75, 76, 77 and 78 and is used by the signatories to review and then to approve or reject an order. This screen is also used by the processors for updates such as ordering and receiving dates and price changes.

The Order Status screen, illustrated in FIG. 2, provides a Buyer/Processor or Requester the most current approval status of each active order. The user selects the orange Processor name button 110 or orange Requester name button 112, types the name for which the user wishes to view orders and then clicks "Continue". If more details are needed, the user clicks the Order Number box 58 or 59 and then uses the green "GO TO" button to navigate to the desired screen.

The Reports screen (not shown) generates reports based on the Processor/Buyer, Requester, Job Order Number, (Organization) Code, and Project fields selected. The report can be a combination of fields and for a specific time frame.

The Processor Page screen, illustrated in FIG. 4 allows the Processor to select the type of purchase, fill in items such as the Fund Type, e-mail the Requester, and print the appropriate form(s).

Help Buttons are available on most pages and can be identified by the green question mark (?) inside the green square buttons. These buttons offer additional information the user may need to determine the correct response for the corresponding block. If there is a pull-down list, the user clicks on the item needed and it will appear in the block.

Figure 5:
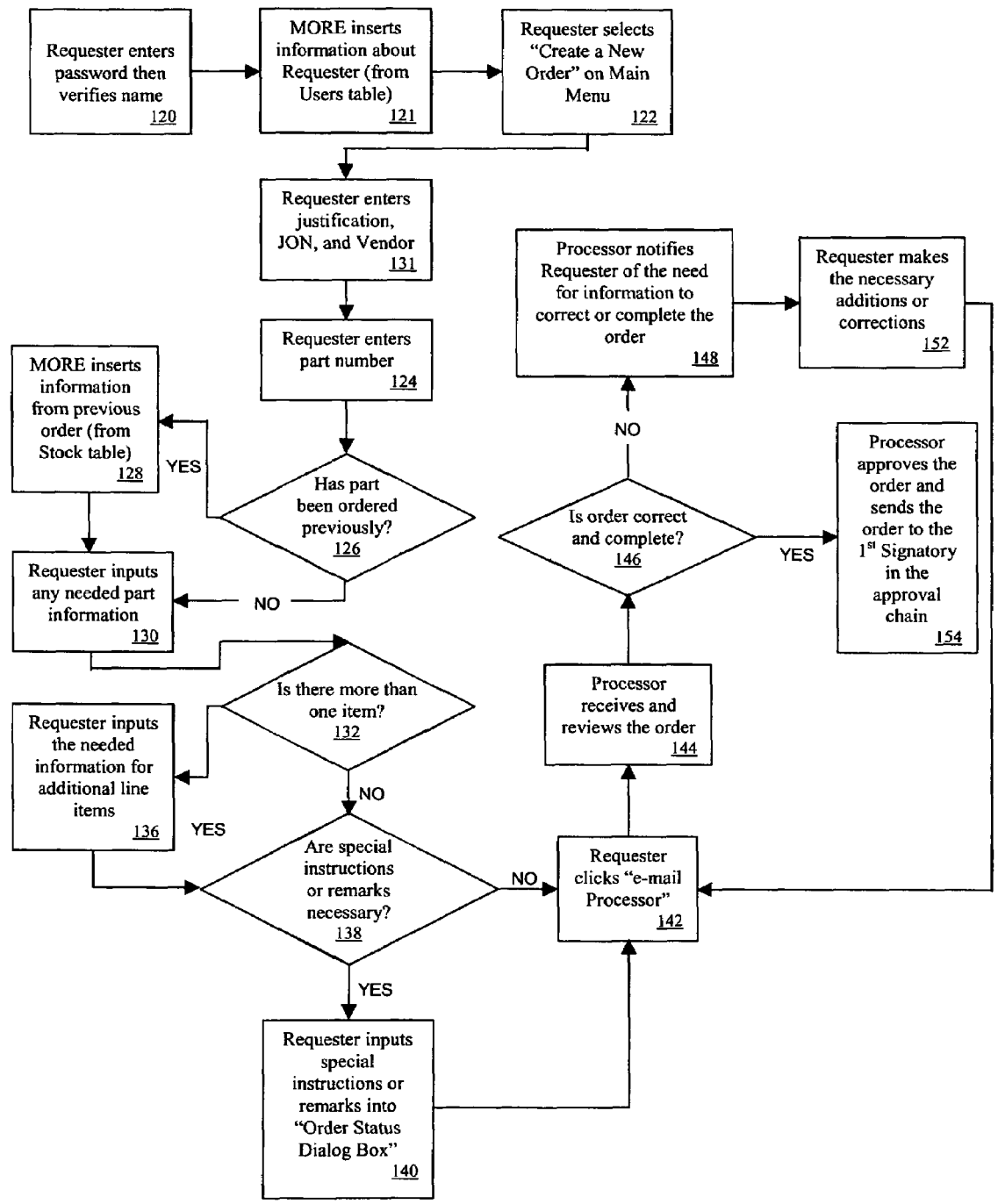
FIG. 5 is a flow chart illustrating the processing steps of creating an order using the Material Ordering and Reporting Expediter in accordance with a preferred embodiment of the present invention.

Referring to FIG. 5, there is shown a flowchart illustrating the processing steps 120-154 which create an order using the Material Ordering and Reporting Expediter in accordance with a preferred embodiment of the present invention. Processing steps 120, 122 and 124 require the requester to enter a password (step 120), verify his/her name (step 120), select "create a new order" on the Main Menu (step 122), and then enter a part number (Step 124). Processing step 126 asks whether a part has been previously ordered. If the part has previously been ordered, MORE inserts the required information from a previous order (processing step 128), otherwise the requester must enter this information (processing step 130), which includes, for example Nomenclature block 33, Manufacturer block 45 and Unit Cost block 35.

During processing step 121 MORE inserts information about the Requester from a users table.

Processing step 132 ask the question is there more than one item. If the answer is "Yes" than the program proceeds to processing step 136 which requires the Requester to input information needed to for additional line items which are to be purchased. The Requester starts with the Part Number so that if automatic fill-in is possible, it will occur first. If the answer is "NO" then the software asks the question are special instructions or remarks necessary (processing step 138).

If special instructions are required for the order, the Requester enters these instructions and/or remarks into the "Order Status Dialog Box" 94 (processing step 140). The Requester e-mails the Processor to process the order by clicking an on-screen button 21 (processing step 142). The processor receives and reviews the order (processing step 144), determines whether the order is correct and complete (processing step 146), approves the order when the order is complete, and sends the order to the first signatory in the approval chain (processing step 154). When the order is incomplete or there is an error in the order, the Processor notifies the Requester of the need for additional information to complete the order or to correct the order (processing step 148). The Requester makes the necessary additions and/or corrections to the order (processing step 152) and returns the order to the Processor for review.

Figure 6:
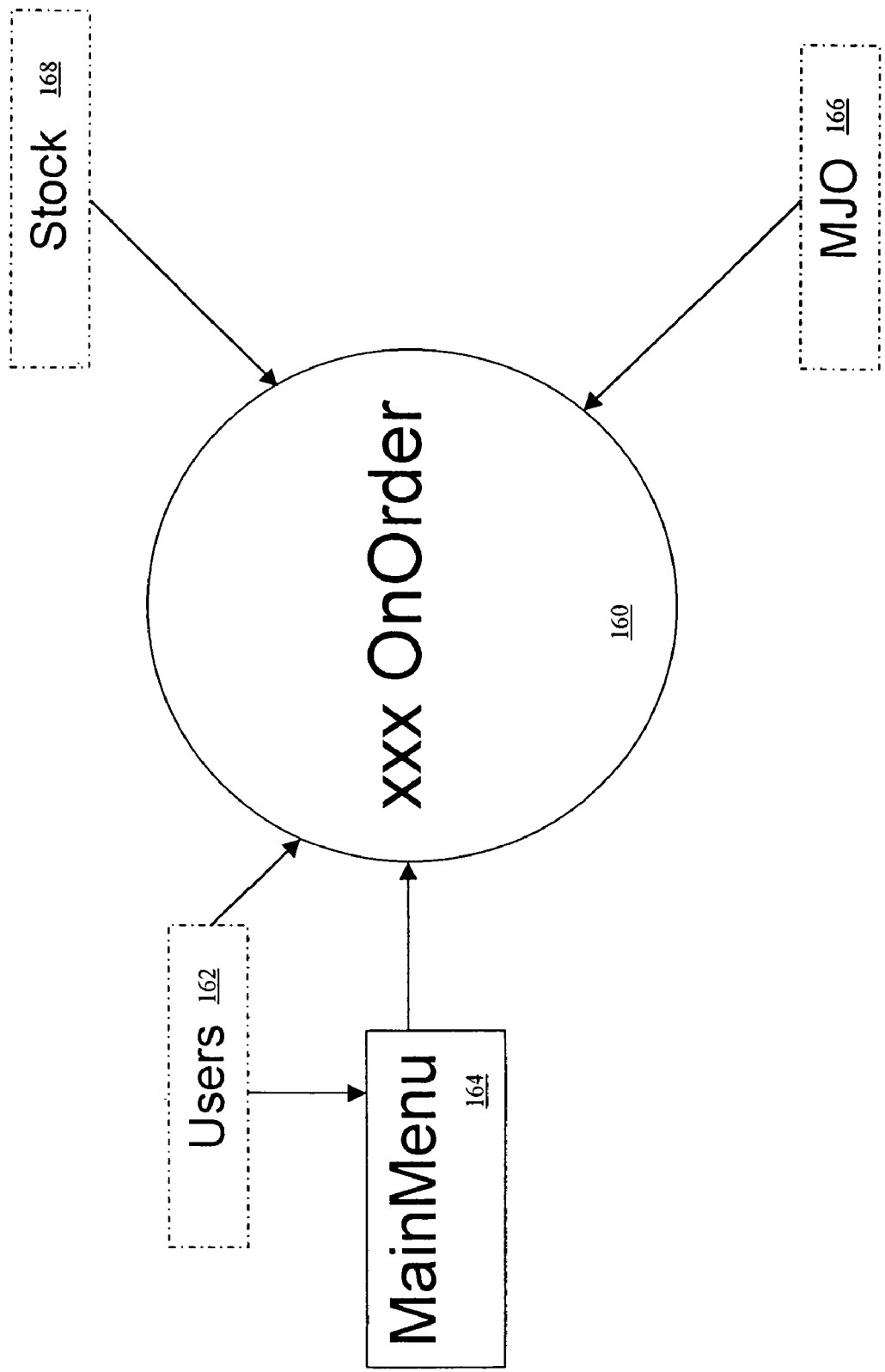
FIG. 6 illustrates computer systems in a network that are configured in accordance with a preferred embodiment of the present invention.

FIG. 6 illustrates computer files 160, 162, 164, 166 and 168 in a network configured in accordance with a preferred embodiment of the present invention. Computer file 160 represents the aggregate of orders for the current fiscal year, file 162 represents the database file with user information, file 164 represents the main menu for the Material Ordering and Reporting Expediter, file 166 represents the database with job order number information, and file 168 represents the stock database which contains information on all items ordered in the MORE program.

Figure 7:
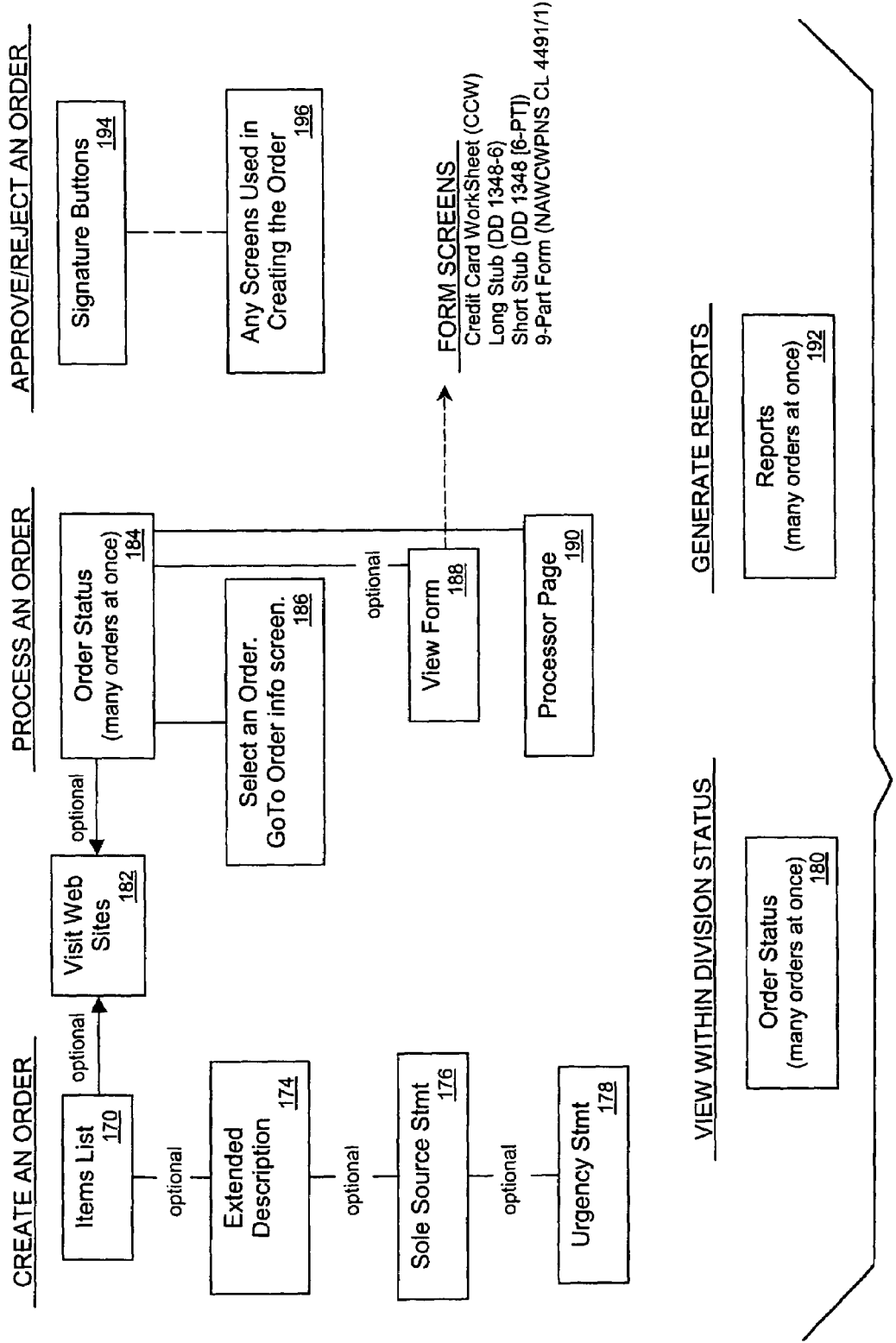
FIG. 7 illustrates a simplified block diagram of the Material Ordering and Reporting Expediter, configured in accordance with a preferred embodiment of the present invention.

FIG. 7 illustrates a simplified block diagram flow chart of the Material Ordering and Reporting Expediter, configured in accordance with a preferred embodiment of the present invention. To create an order, the requester enters the main menu then proceeds to the Item 1 menu (processing step 170) of FIGS. 1A and 1B and provides the required information. The Requester may provide an extended description of the item to be ordered by utilizing block 46 (processing step 174). The Requester may provide a sole source statement for the item(s) to be ordered by utilizing block 47 (processing step 176).

A sole source statement justifies ordering the item(s) from a single source without price competition from multiple vendors. It is generally used when a vendor has an item/items which is/are uniquely configured for a particular application.

The MORE program includes a Requirements and Guidelines Screen which is used to prepare sole source justification.

The user first clicks the SOLE SOURCE button block 47, which takes the user to the Requirements & Guidelines screen. This screen has a brief, high-level description of the 4 areas/paragraphs which are specific requirements for a sole source justification.

The Long Stub Small Purchase Sole Source Justification screen includes the following information.

Long Stub Small Purchase
Sole Source Justification

Your Long Stub Sole Source justification should cover four (4) areas/paragraphs:
1. Description of the Products, Supplies or Services
2. Rationale supporting the Sole Source Buy
3. Market Research
4. Urgency—do not confuse with Urgency statement Be sure to include your Signature & Date signed, Code, and Phone Number.

To the right of each of these 4 numbered, high-level statements is a small, green Question Mark symbol ⓘ When the user clicks on one of the small, green Question Marks, a box pops up with a brief explanation of the particular area/paragraph. The following are the pop-up messages that appear on the screen when the user click one of the small green Question Marks:

1. Enter a brief description of the supplies or services required, the program/project/system to be supported, and the intended use. ID specific makes and models. Include item name, part number & manufacturer.
2. Provide info to support requiring a specific make and model or contractor/vendor. Possible reasons are: unique capabilities, compatibility, proprietary rights, and direct replacement parts.

3. Discuss any market research conducted to ID qualified sources. Research may be written or telephone conversations with knowledgeable personnel, or ads in technical journals. Be specific about personnel & companies contacted and results of the research.

4. Describe the extent and nature of the harm to the Government or a Government Agency if a delay occurs in purchasing the item. Estimate the cost resulting directly from the delay in man hours lost and/or dollars lost.

If the high-level statements and pop-up boxes are not sufficiently clear, a more detailed explanation for the requirements of each of these statements is available by clicking a large, green Question Mark symbol  to the right of the 4 smaller Question Mark symbols. The following illustrates the screen for a detailed explanation of the four area/paragraphs.

Requirements & Guidelines for Small Purchases (<$100K, GSA to $500K) Long Stub Sole Source Documentation Purchases over $2500 may be solicited to a single source only if the contracting officer determines that only one source is reasonably available. This determination must be supported by a full justification for sole source procurement from the customer.

An adequate Sole Source Justification should include the following components.

1. Description of the Supply/Service
   Briefly describe a) the item(s) or service(s) being purchased, b) the program/project/system it/they will support, and c) the intended use. Identify specific makes and models, including name of item, part number, and manufacturer.

2. Rationale Supporting the Sole Source
   Provide information to support the reason for requiring a specific make and model or contractor/vendor. Some considerations that you may wish to include are:
   a. What unique capabilities does the proposed contractor or specific manufacturer's make/model possess which make that company or its product the ONLY company or product capable of meeting the government's minimum requirements? If equipment or capability is require based on certain unique features, the features must be identified.
   b. If compatibility with existing equipment is required, the justification should prove that the contractor or the specific manufacturer's make/model described is the only source/product capable of satisfying the stated compatibility requirements.
   c. In some cases, a product or process may be exclusively owned by a contractor, thereby establishing proprietary rights. If the government's minimum needs can only be met by a specific product and the proprietary nature of the product precludes other companies from utilizing the process, then clearly explain why or how proprietary rights are involved. Software maintenance is an example of a product whose process is proprietary to a specific company and no others are allowed to duplicate or have knowledge of the process without the company's permission.
   d. Direct replacements parts; spare parts for repair clearly identify the critical form, fit, function, and performance parameters that cannot be obtained from another manufacturer.

3. Market Research
   Give results of any market research that was conducted to identify qualified sources capable of meeting the requirement. Examples of market research include written or telephone conversations with government personnel or contractors knowledgeable about the product or services being purchased or announcements in technical/scientific journals. Be specific about who or what companies were contacted and the results of the research.
   Statements such as "only known source", "only source that can meet the required delivery schedule", or "no other source can provide the item or service at a lower price," are inadequate and insufficient to support a sole source purchase.

4. Urgency
   At times an order must be placed immediately due to unanticipated circumstances. An urgent requirement statement must describe the extent and nature of the harm to the Government that will result if a delay occurs. Include an estimate of the cost of this injury either in man-hours or dollars lost as a direct result of the delay. Expiring funds is NOT a reason to place an urgent order.

5. Signature
   The requester must sign the justification.
   The following illustrates a completed sole source justification:
   SOLE SOURCE PROCUREMENT LESS THAN $25,000
   POINT OF CONTACT: JANE DOE, Code 543211E, X5432, COST<$7000

1. Item Description
SOURCE MANUFACTURES NAME: STOODY INDUSTRIAL & WELDING SUPPLY 3316 NATIONAL AVENUE SAN DIEGO, Calif. 93113-2639
NOMENCLATURE: GAS, HELIUM, OIL FREE, GRADE A, CYLINDER
MODEL: K-CYLINDER, GOVERNMENT OWNED
   This statement is for the purchase of Helium for 160 cylinders. Government owned cylinders are to be picked up by the vendor and refilled with Helium and then delivered back to NBVC, Point Mugu, Calif. Cylinders will be serviced, if required, as part of the order. Helium is used in the Upper Air Program, at Point Mugu and San Nicolas Island to support operation of the Sea Test Range.

2. Rationale for Sole Source
   Helium is a lighter than air gas and is used for weather balloons. It is an inert gas and safe to use. The other source of gas is Hydrogen which is not a safe gas to use or handle. Stoody's has a government contract in place. Stoody's has demonstrated the ability to refill the government-owned cylinders in a timely manner.

3. Market Research
   Market research shows that Stoody's is the most cost effective vendor to use. Stoody's currently has a government contract in place with the Contracting Department of the Fleet and Industrial Supply Center in San Diego, Calif. Stoody's will provide all services required for $xx.xx per cylinder. This amount comes to $x,xxx.xx (160 cyl×$xx.xx). Other sources surveyed indicate the cost for 160 cylinders would be nearly double the afore mentioned amount.

4. Urgency
   Helium is used in the Upper Air Program, at Point Mugu and San Nicolas Island to support operation of the Sea Test Range. Data from the Upper Air Program is necessary for many test operations and provides valuable information on the atmosphere to test engineers and other test components utilizing the Sea Test Range.

After the user enters the required information for the sole source justification the user signs and dates the Justification and includes his code, and phone number.

A sole source purchase of an item may be required when a critical component of an aircraft or multiple aircraft fails and there is an urgent need to get the aircraft back in service. For example, if the landing gear on several F-16 aircraft failed during a war and the only source for the landing gear is the original equipment manufacture, a sole source when supported by these facts would justify the purchase of the landing gear without full and open competition.

A sole source purchase may be required when there is a need to analyze test and design data relating to a failure of a missile system and there is only one expert who is qualified to analyze the data and recommend design changes to the missile to prevent further operational failures of the missile during flight.

The requester may also provide an urgency statement for the item(s) to be purchased utilizing block 48 (processing step 178).

The user first clicks the URGENCY button block 48, which takes the user to the Statement of Urgency/Mission Impact screen. This screen has a brief, high-level description of the 5 areas/paragraphs which are specific requirements for an urgency statement.

The Long Stub Urgency Justification screen includes the following information.

Long Stub Urgency Statement

In writing your Long Stub Urgency justification consider five (5) items:
1. Impact to the Navy/Gov't if request not granted
2. Date required
[3. Sole Source stmt still needed if >$2500]
4. Past procurement history if pertinent
5. FAD authority if other than IV Be sure to include your Signature & Date signed, Code, and Phone Number.

To the right of numbered statements 1, 2 and 5 are small, green Question Mark symbols  When the user clicks on one of the small, green Question Marks, a box pops up with a brief explanation of the particular area/paragraph. The following are the pop-up messages that appear on the screen when the user click one of the small green Question Marks:
1. Relate the impact in terms of cost to the Navy and loss of mission capability. Be specific: project to be canceled, nation-wide operation, exorbitant cost, etc.
2. Be specific. Give a date by which the item has to be on board.
5. Attach a copy of the memo granting you use of the customer's higher Force Activity Designator (FAD). These are priority designators. The first designator is the item is broke, operations are shut down and the mission can not be completed; the second designator is the item has intermitent failures, is about to break and would shut down operations and the third designator is routine maintenance. The lower the FAD number the higher the priority is for acquiring the item.

If the high-level statements and pop-up boxes are not sufficiently clear, a more detailed explanation for the requirements of each of these statements is available by clicking a large, green Question Mark symbol  to the right of the 3 smaller Question Mark symbols. The following illustrates the screen for a detailed explanation of all five area/paragraphs.

Statement of Urgency/Mission Impact

Use an Urgency statement to justify speedier procurement of many Long Stub orders. Orders between $25K and $100K will be advertised in the Commerce Business Daily (CBD), where the synopsis will run for 15 days. Since the synopsis has to be written and placed, expect more than 15 days to be added to the procurement cycle. If this delay jeopardizes your project or operational readiness, an acceptable Urgency statement will override the CBD requirement.

Hints to use for "Walk-Thru-or-Priority 07 Justifications"
1. State in clear terminology what the impact will be to the Navy/Govt if this request is not granted. Relate the impact in terms of cost to the Navy and loss of mission capability. Be specific: project to be canceled nationwide operation exorbitant cost, etc.
2. Address the time element. Again, be specific. Give a date by which the item has to be on board. URGENCY implies TIME is essential; do not omit addressing the on-board date.
3. If over $2500, include a sole source justification. An urgency statement does not preclude a sole source justification.
4. Include past procurement history if it is relative to the current situation.
5. State the Force Activity Designator (FAD) authority if other than IV. Attach a copy of the memo granting you use of the customer's higher FAD. (FADs are discussed below under Priority.)

Discussion/presentation of FADs is omitted here due to its prior presentation in Table II, which is associated with the Priority field.

The following is an illustrative example of an urgency statement.

URGENCY STATEMENT

20 Feb., 2001

N63126-1051-01W5
1. Critical data will be lost or no data will be available for use by customers who schedule and use the Sea Test Range facilities at Point Mugu, Calif. Customers include the Japanese Defense Agency and the U.S. Pacific Fleet. The currently deployed Sea Buoy has been in place for 11 months. Battery life has decreased to a point where it must be retrieved and a new buoy deployed to replace it. Critical data used by Sea Range Programs for the GO/NO GO decision making process and the report of real-time sea state conditions for small craft advisories, target operations/recoveries and Search and Search and Rescue missions will be severely impacted.
2. The information is used by nearly all customers utilizing the Sea Test Range to the West of San Nicolas Island. Potential dollar lose, by the Sea Test Range, cannot be accurately determined, but it could run into the hundreds of thousand of dollars.
3. Due to constraints imposed by the current budget process and other unforeseen problems, monies were not provided to accomplish the painting/refurbishing of Sea Buoys until the first week in February.

John Doe

Geophysics ranch, Code 521430E

X4567/7899

This is in direct support of JDF operations. Items are needed to manufacture the mooring lines for the Sea Buoy. The Sea Buoy is anchored approximately 10 miles of West of San Nicolas Island in support of the JDF and other Sea Test Range operations. Without the additional supplies to manufacture the mooring lines for the Sea Buoy, critical information used to make the GO/NO GO decision for operations on the Sea Test Range will be lost. Current Sea Buoy must be removed and replaced with a refurbished Sea Buoy by the final week in Apr. 2001.

By utilizing block 52, the Requester may visit a single vendor Web Site or multiple vender Web Sites (processing step 182). The Requester may view the status of his/her order from the screen illustrated in FIG. 2 (processing step 180). There is also an option to view the different forms to purchase an item such as the credit card work sheet, the long stub and/or the short stub (processing step 188).

The Processor page, used by the processor to purchase the item(s), is illustrated in FIG. 4 (processing step 190). Similarly, the signature screen which sets forth the signature chain required for approval to purchase the item(s) is illustrated in FIGS. 3A and 3B (processing step 194). The Material Order and Reporting Expediter also allows for the generation of reports for items being purchased (processing step 192) and includes a screen for viewing purchases within a division (processing step 180).

Although the description above contains many specificities such as indicators and purchasing forms, these should not be construed as limiting the scope of the invention but as merely providing an illustration of the presently preferred embodiment of the invention. Thus the scope of the invention should be determined by the appended claims and their legal equivalents.

What is claimed is:

1. A computer-based networked system for coordination of a government purchase document and approval of said government purchase document by an approval chain having a plurality of signatories, comprising:

means used by a requester to create said government purchase document, said requester selecting said government purchase document to be created by said requester from a group of government purchase documents consisting of a DD (Department of Defense) Form 1348 Six Part Requisition Document, a DD Form 1348-6 Requisition Document and a work sheet for a government bankcard purchase;

first notifying means for notifying a processor of said government purchase document, wherein the processor reviews said government purchase document for completeness and accuracy and upon finding said government purchase document to be complete and accurate, the processor forwards said government purchase document to said approval chain;

means for determining said approval chain for said government purchase document;

means for sending said government purchase document through said approval chain, wherein each of the signatories approves said government purchase document by affixing an electronic signature to said government purchase document before said government purchase document is forwarded to a next signatory in said approval chain for approval;

second notifying means for notifying the processor of approval of said government purchase document, wherein the processor is notified after a final signatory in said approval chain approves said government purchase document;

means for providing a sole source statement for the purchase of said item, wherein said requester provides said sole source statement, said sole source statement justifying the purchase of said item without price competition from multiple vendors, wherein a vendor has a product, supply or service to be purchased which is uniquely configured for a particular application and said requester accesses a Requirements and Guideline Screen within said computer-based networked system to provide sole source justification information for a sole source buy, said sole source justification information including a description of said product, supply or service to be purchased; a rationale supporting said sole source buy of said product, supply or service; market research by said requester to identify said vendor as a qualified vendor to supply said product, supply or service; and an urgent requirement statement which sets forth a statement of harm to a government agency when a delay occurs in purchasing said product, supply or service from said vendor;

means for providing an extended description of said item to be purchased using said computer-based networked system, wherein said requester provides said extended description of said item to be purchased;

means for providing an urgency statement to expedite the purchase of said item, wherein said requester provides said urgency statement to expedite the purchase of said item, said urgency statement to expedite the purchase of said item including an impact statement to the Government agency in terms of cost to the Government agency and a loss of mission capability to the Government agency; a date by which the item needs to be delivered to the Government agency; said sole source statement when said item cost more than twenty five hundred dollars; and a past procurement history for said item;

means for printing an approved government purchase document, wherein said approved government purchase document contains procurement data which is relevant to the purchase of said item and the electronic signature of each of said signatories in said approval chain, wherein said procurement data relevant to the purchase of said item includes a nomenclature for said item to be purchased, a unit of issue for said item to be purchased, a unit cost for said item to be purchased, a National Stock number for said item to be purchased and a distribution code for said item to be purchased; and means for providing a job order number for said item to be purchased, said requester providing the job order number for said item to be purchased, wherein said computer-based networked system having a master job order file which includes said job order number to validate said job order number, insure a positive funds balance for said job order number and insure that said job order number allows for a purchase of said item.

2. The computer-based network of claim 1 wherein a force activation designator authority is provided by said requester when a past procurement history for said item is not being supplied by said requester.

3. The computer-based networked system of claim 1 wherein said computer-based networked system provides an expiration date on said government purchase document for funds used to purchase said item when said computer-based networked system indicates said positive fund balance is available for the purchase of said item.

4. The computer-based networked system of claim 1 wherein the description of said product, supply or service to be purchased for said sole source buy includes a product name, a product part number, a manufacturer and an intended use for said product, supply or service.

5. The computer-based networked system of claim 1 wherein the rationale supporting the sole source buy of said product, supply or service is selected from the group consisting essentially of a statement covering unique capabilities of said product, supply or service, a statement covering compatibility of said product, supply or service with existing products, supplies or services, a statement describing proprietary rights of said vendor in said product, supply or service, and a statement identifying said item to be purchased as a direct replacement part.

6. The computer-based networked system of claim 1 wherein said urgent requirement statement for said sole source buy includes an estimate of cost resulting directly from the delay in purchasing said product, supply or service in man hours lost and dollars lost.

* * * * *